ated Aug. 25, 1970

3,525,913
PULLOUT PROTECTION FOR SYNCHRONOUS MACHINES
Colin Edward Huggett, West Seneca, and Herman Eisele and Frank Di Nicolantonio, Williamsville, N.Y., assignors to Westinghouse Electric Corporation, Pittsburgh, Pa., a corporation of Pennsylvania
Filed Apr. 29, 1968, Ser. No. 724,898
Int. Cl. H02h 7/08
U.S. Cl. 318—170        12 Claims

ABSTRACT OF THE DISCLOSURE

Described is a system for providing pullout protection for synchronous motor machines, when the maximum torque of the machine is exceeded by means of continuously measuring the load angle between the rotor and stator flux vectors, together with means for deenergizing the synchronous machine when the maximum permissible load angle is exceeded.

BACKGROUND OF THE INVENTION

As soon as the maximum or pullout torque of a synchronous motor or other machine is exceeded, the machine will commence to slip poles. If the load is not removed immediately, then the machine will "pull out" of synchronism and this can cause extensive damage to its windings. Consequently, it is highly desirable to detect slipping of a pole of such a machine as soon as it occurs and to remove the alternating current power from the machine such that it can be brought to a standstill.

The usual method for sensing when a synchronous machine has pulled out of synchronism is by monitoring the field current. When a pole is slipped, large flux changes occur in the machine, causing large fluctuations in field current. When these field current fluctuations exceed a certain value, the machine is shut down. This arrangement, however, has several disadvantages. For example, with machines operating on a severe duty cycle, such as motors used on large shovels, the armature current is continually changing, and these changes will cause disturbances in the field current of the machine. Hence, it is necessary that the field current sensing system to be desensitized in order that the field current variations will not cause erroneous indications of a pullout condition.

Likewise, for large synchronous machines, it is necessary to employ field current regulators to control the power factor or motor terminal voltage. This means that the field current is continually changing so as to attempt to keep one of the variables constant. Such changes in the field current will necessitate a further reduction in sensitivity of the pullout monitoring device; and it is frequently so insensitive that it provides very marginal protection. Finally, a pullout protection system which relies on monitoring of the field current is analog in nature. As a result, the system is liable to drift, thus causing further desensitizing.

SUMMARY OF THE INVENTION

As an overall object, the present invention seeks to provide a pullout protection system for synchronous machines which overcomes the disadvantages of prior art systems which attempt to monitor field current. In this respect, disturbances in the field current of the machine are not sensed to control the pullout protection system of the present invention.

Another object of the invention is to provide a pullout protection system of the type described which is digital in nature and wherein a first control pulse is produced at least once during each cycle of an alternating current source applied to a synchronous machine. The phase of this first pulse is compared with that of a second pulse produced each time the rotor of the machine rotates through a predetermined number of degrees. When the phase angle between these pulses increases to a certain maximum phase angle, indicating an overload condition protection circuitry is actuated for shutting down the machine.

Still another object of the invention is to provide a pullout protection system for a three-phase synchronous machine wherein overload protection is provided under both motoring and regeneration conditions of operation.

In accordance with the present invention, a pullout protection system is provided including means for producing a first pulse at least once during each cycle of an alternating current source applied to a synchronous machine, means coupled to the rotor of the machine for producing a second pulse each time the rotor has rotated through a predetermined number of degrees, and control means for producing a third pulse which is displaced in phase from the first pulse by a fixed phase angle. The first and second pulses are applied to flip-flop means for producing a square wave in which the leading and trailing edges of the square wave coincide with the first and second pulses. This square-wave output from the flip-flop means is then compared with the third pulse to produce an output signal when the square wave overlaps the third pulse, the output signal acting to disable the synchronous machine.

Normally, the phase angle between the first and second pulses will be such that the square-wave output of the flip-flop means will not coincide with the third pulse in the comparing means. However, as the load is increased and the rotor retarded, the phase angle increases as does the width of the square-wave output of the flip-flop until, at pullout condition, the square-wave coincides with the third pulse, thereby producing a signal for shutting down the machine.

Further, in accordance with the invention, the foregoing principle can be readily applied to a three-phase synchronous machine to provide both regeneration and motoring protection. In this system, a pulse is produced once during each cycle of each phase voltage, the three pulses being displaced in phase with respect to each other. The intermediate one of the three pulses is then applied to flip-flop circuit means together with a pulse from a pickup on the rotor. When the rotor is retarded, the square-wave output of the flip-flop circuit is increased in one direction until it coincides with one of the other two pulses produced by the phase voltages. Conversely, when the rotor advances, as in regeneration, the square-wave output of the flip-flop is increased in width in the opposite sense until it coincides with the remaining one of the three pulses produced by a phase voltage. Coincidence of the square-wave output of the flip-flop with either one of the aforesaid two remaining pulses acts to shut down the synchronous machine.

The above and other objects and features of the invention will become apparent from the following detailed description taken in connection with the accompanying drawings which form a part of this specification, and in which.

Figure 3:
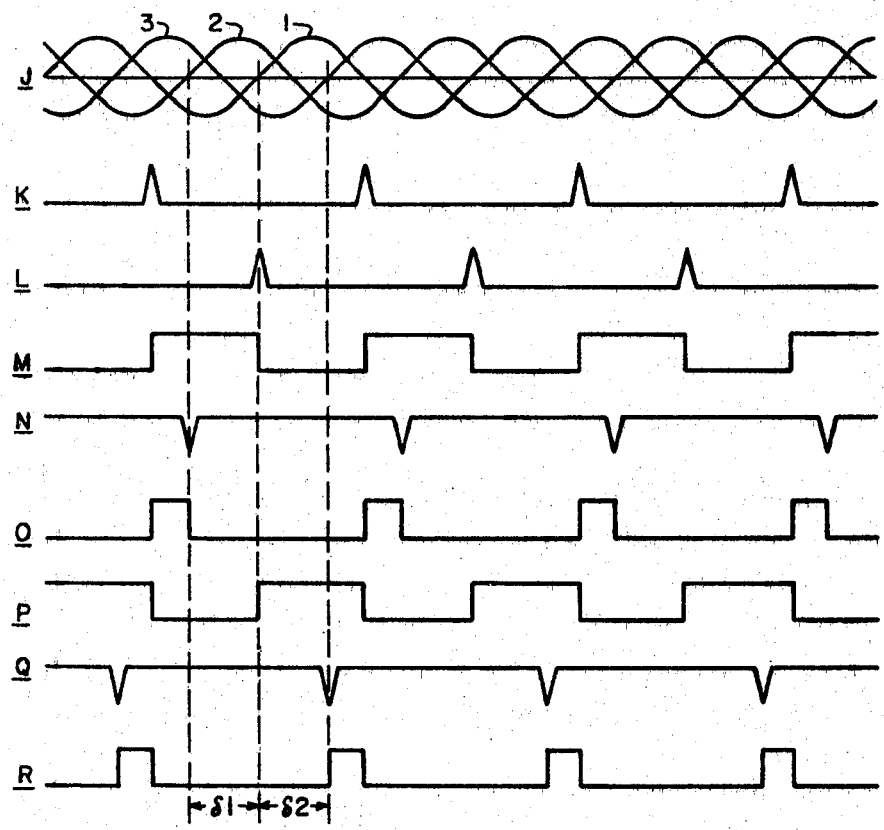
Figure 4:
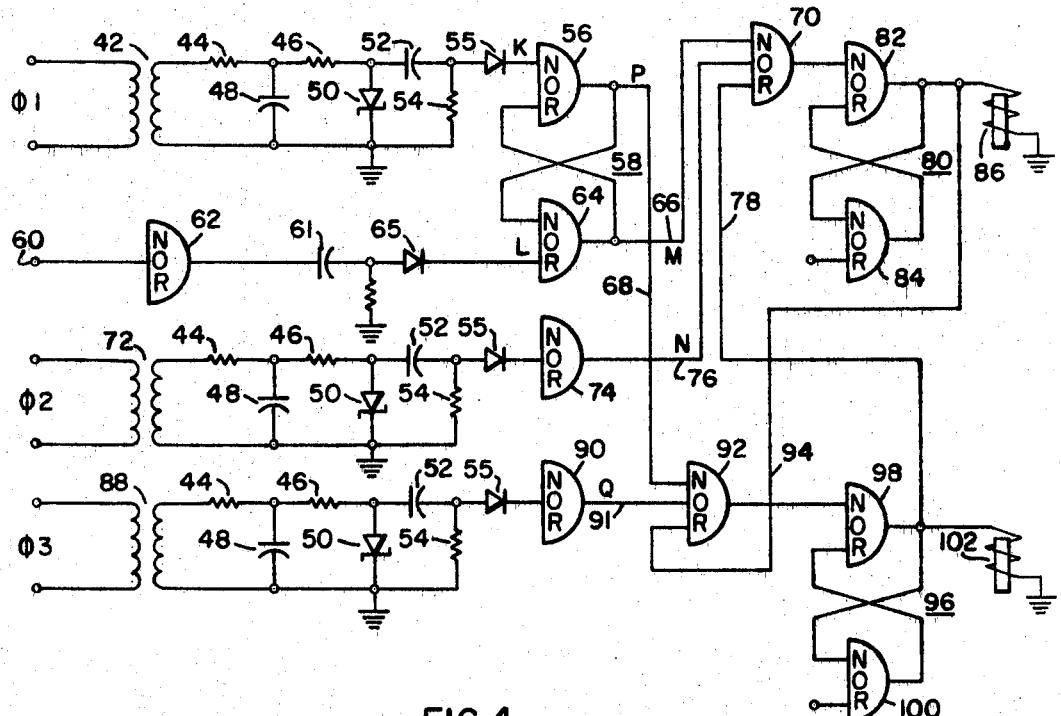

FIG. 3 comprises waveforms illustrating the application of the invention to a three-phase synchronous machine for providing both motoring and regeneration protection; and FIG. 4 is a schematic circuit diagram of another embodiment of the invention operating in accordance with the waveforms of FIG. 3.

Figure 1:
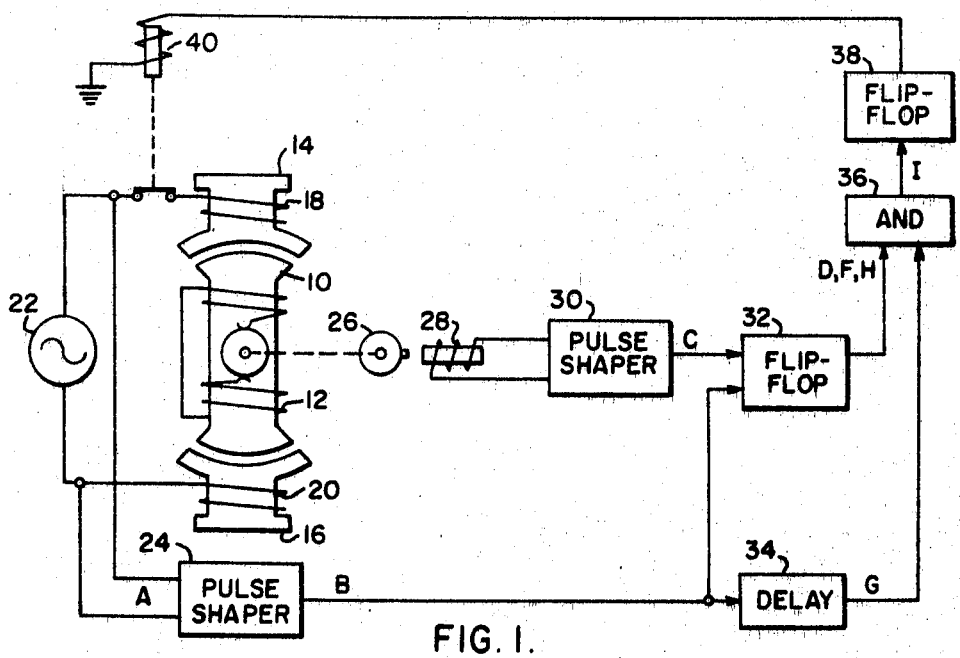
FIG. 1 is a schematic block diagram of a simplified embodiment of the invention.

With reference now to the drawings, and particularly to FIG. 1, a simplified, schematic synchronous motor is shown comprising a rotor 10 having a winding 12 to which a direct current potential is applied; and a stator comprising two poles 14 and 16 having windings 18 and 20 connected to a source of alternating current potential, schematically illustrated at 22. The output of the alternating current source 22 is applied to a pulse shaper 24, the alternating current output waveform being illustrated as waveform A in FIG. 2. The pulse shaper, which may take various well known forms, produces an output pulse once during each cycle of the applied alternating current shown as waveform A. The output of the pulse shaper, therefore, appears as waveform B in FIG. 2, wherein a pulse is produced at the peak of each positive half cycle of the applied waveform A from source 22.

Connected to the rotor 10 is a rotating toothed wheel 26. Located adjacent the periphery of the wheel 26 is a magnetic pickup 28 which will produce a pulse each time the illustrated tooth on the wheel 26 passes thereby. It should be understood, however, that a photocell or the like pickup can be used in place of the magnetic pickup 28 shown herein. The pulse from pickup 28 is applied to pulse shaper 30, the output of the pulse shaper 30 appearing as waveform C in FIG. 2. It can be seen that for every pulse in waveform B obtained from the applied alternating current source, one pulse is produced by the toothed wheel 26, and this pulse shown in waveform C is phase adjusted by mechanical positioning of the pickup to be intermediate pulses in waveform B. This then gives the number of teeth on the toothed wheel as the number of pairs of poles on the machine. Thus, for a machine with three pairs of poles, three teeth are needed on the wheel 26, equally spaced around its circumference.

Figure 2:
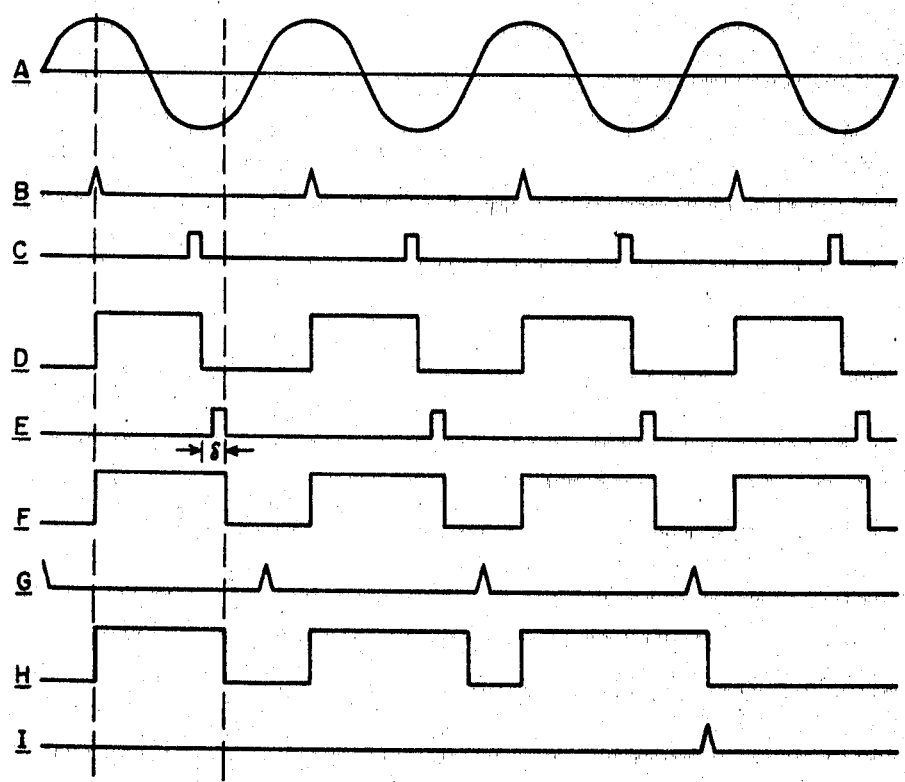
FIG. 2 are waveforms appearing at various points in the circuitry of FIG. 1.

The outputs of the pulse shapers 24 and 30, comprising respective waveforms B and C in FIG. 2, are applied to a flip-flop circuit 32 which will produce a square-wave output illustrated as waveform D in FIG. 2 under no load conditions. Note that the leading edge of each square-wave pulse in waveform D coincides with a pulse in waveform B; while the trailing edge of each such pulse corresponds with a pulse in waveform C.

As the load on the machine is increased, the load angle increases. This causes the rotor to be retarded by some angle $\delta$. Thus, the output pulses from pulse shaper 30 will now be shifted and appear as waveform E in FIG. 2 wherein they are delayed with respect to those in waveform C by the phase angle $\delta$. This causes the square-wave pulses at the output of flip-flop circuit 32 to increase in width as illustrated by waveform F of FIG. 2 wherein each pulse has been increased in width by the phase angle $\delta$.

The output of pulse shaper 24 is also applied to a well known delay circuit 34 where the pulses are delayed by 300°. Hence, waveform G appears at the output of delay line 34 wherein each pulse lags a corresponding pulse in waveform B by 60°. Let us assume that the load angle increases progressively as illustrated by waveform H in FIG. 2. Thus, the first square-wave pulse in waveform H illustrates a load angle of approximately 45°; the second square wave pulse illustrates a load angle of approximately 90°; and the third pulse illustrates a load angle of approximately 120°, the maximum permissible load angle for most synchronous machines. At this point (i.e., a load angle of 120°), a pulse in waveform G coincides with a square-wave pulse in waveform H. Consequently, by applying the output of flip-flop 32 (waveform H) and the output of delay line 34 (waveform G) to an AND circuit 36, the AND circuit will produce an output pulse illustrated as waveform I in FIG. 2 when the load angle reaches 120°. This pulse is utilized to actuate a flip-flop circuit 38 to energize a circuit breaker 40 or some other similar device to disable the synchronous machine.

It can be seen, therefore, that the system of FIG. 1 provides pull-out protection by continuous measurement or sensitivity of load angle. It can be shown that for cylindrical rotor machines with load damping, the load angle can reach 135° after a sudden application of a load without pulling out. For a salient pole type of machine, this angle is reduced to approximately 120°; and for other and different types of machines it can be increased or decreased, depending upon requirements. The present protection system is digital in operation and substantially uneffected by large fluctuations in field current.

The pulses in waveform B of FIG. 2 which represent the position of the peak flux wave, and the pulses in waveform G which are 300° in advance are obtained from the alternating current source 22. Of interest is the peak of the rotating flux wave, and it can be shown that every time one of the phase voltages passes through zero in a three-phase synchronous machine, there exists a definite relationship between this point and the position of the peak flux wave. Consequently, it is only necessary to obtain a pulse every time one of the phase voltages passes through zero.

The waveforms for a three-phase arrangement are shown in FIG. 3 wherein the waveform J illustrates the applied three-phase alternating current, the three phases being generally indicated by the numerals 1, 2 and 3. By producing a differentiated pulse each time phase 1 passes through zero while going in a negative direction, waveform K is produced which corresponds to the flux waveform B in FIG. 2. The pulses produced by a toothed wheel on the rotor of the machine are represented by waveform L and are intermediate those in waveform K at no load. Applying the waveforms K and L to opposite sides of a flip-flop circuit produces the square waveform M.

Pulses delayed 300° with respect to the pulses in waveform K can be obtained by producing spiked pulses as phase 2 passes through zero in the positive-going direction. Such pulses are illustrated as waveform N in FIG. 3. When the load angle increases by the phase angle $\delta_1$, the square-wave output of the flip-flop will appear as waveform O wherein the pulses in waveform N overlap the square-wave pulses in waveform O, thereby producing an output which can be used to shut down the synchronous machine.

By inverting waveform M at the output of a flip-flop circuit, waveform P results. Pulses which lag those in waveform K by 60° can be produced each time phase 3 passes through zero in the positive-going direction, thereby producing waveform Q. Now, under regeneration conditions, the rotor of the synchronous machine will lead the flux wave, thereby advancing the leading edges of the square-wave pulses in waveform P. When the leading edges of the square-wave pulses in waveform P are advanced by the phase angle $\delta_2$, waveform R results wherein the square-wave pulses overlap those in waveform Q, again producing an output which can be used to shut down the synchronous machine.

One type of circuit for effecting control action for a three-phase synchronous machine under the conditions illustrated in FIG. 3 is shown in FIG. 4. Phase 1 of waveform J is applied via transformer 42 to a filter comprising resistors 44 and 46 and capacitor 48. The filter acts to filter out any high frequency components; and the resulting wave shape is applied across a Zener diode 50. After the reverse voltage across the Zener diode has built up to the Zener breakdown level, the Zener diode 50 thereafter limits, producing a stepped output which is fed into a differentiator comprising capacitor 52 and resistor 54 and diode 55. This differentiated output, therefore, will appear as waveform K in FIG. 3 and is applied to one NOR element 56 of a flip-flop circuit 58.

The output of a magnetic pickup, such as pickup 28, is applied to input terminal 60 and amplified in NOR element 62 and then differentiated by circuit consisting of capacitor 61 and resistor 63 and diode 65. The resulting waveform, appearing as waveform L in FIG. 3, is applied to the other NOR unit 64 of the flip-flop circuit 58. Hence, the output of the flip-flop circuit 58 on lead 66 will appear as waveform M in FIG. 3 for $\delta=0°$. The position of the pulses in waveform L relative to the pulses in waveform K is dependent upon the load angle $\delta$ of the synchronous machine. Under regeneration conditions, for $\delta=\delta_1°$, the output of element 64 will be waveform O. Under motoring conditions, for $\delta=\delta_2°$, the output of element 56 will be waveform R. The output from the other side of the flip-flop circuit on lead 68 will appear as waveform P, for $\delta=0°$. The waveform M on lead 66 is applied to a NOR element 70. Phase 2 of waveform J shown in FIG. 3 is applied through a transformer 72 to a filter, a Zener diode and a differentiator, all identified by the same reference numerals as those used to identify the corresponding elements coupled to the transformer 42. The Zener diode 50 produces a stepped output, the output of the differentiator produces a pulse when the phase 2 of waveform J passes through zero in the positive direction as shown in FIG. 3, and the resulting pulses are inverted in inverter 74 to produce waveform N on lead 76. This waveform N is also applied to the NOR circuit 70.

Ignoring, for the moment, the signals on lead 78, it will be seen that the circuitry thus far described corresponds to that shown in FIG. 1 for regenerative mode of operation.

During regeneration conditions when the flux lags the rotor by $\delta°$, the output wave form of element 64 of the flip-flop circuit 58 will be as shown in waveform O of FIG. 3. Upon coincidence of pulse in waveforms N and O, the NOR circuit 70 will output a pulse which is used to actuate a second flip-flop circuit 80 comprising two interconnected NOR elements 82 and 84; and the output of the flip-flop circuit 80, when triggered, is utilized to actuate a relay 86 which will shut down the synchronous machine when the load angle exceeds the angle $\delta_1$, or 120°.

Phase 3 of waveform J is applied through transformer 88 to a filter, a Zener diode and a differentiator, again identified by the same reference numerals as those used to identify the elements coupled to transformer 42. The resulting pulses, after inversion in inverter 90, will appear as waveform Q in FIG. 3 which is applied via lead 91 to NOR element 92 along with waveform P on lead 68. During motoring conditions, and assuming that the rotor lags the flux wave by the angle $\delta_2$ as shown in connection with waveform R of FIG. 3, an output will appear from NOR element 92, ignoring any signals on lead 94. This output is then used to trigger flip-flop circuit 96 comprising interconnected NOR elements 98 and 100; and the output of the flip-flop circuit is utilized to actuate a relay 102 which, like relay 86, can be used to disable the synchronous machine.

The signal on lead 78 is derived from the output of flip-flop 96; and that on lead 94 is derived from the output of flip-flop circuit 80. In this manner, when flip-flop circuit 80 is triggered, the signal on lead 94 will disable AND circuit 92; and, in a similar manner, when flip-flop 96 is triggered, the signal on lead 78 will disable NOR circuit 70.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A pullout protection system for a synchronous machine having a rotor and a stator, comprising means for producing a first pulse at least once during each cycle of alternating current power applied to said machine, means coupled to said rotor for producing a second pulse each time the rotor has rotated through a predetermined number of degrees, means for producing a third pulse which is displaced in phase from said first pulse by a fixed phase angle, signal supply means responsive to said first and second pulses for producing a square-wave signal having its leading and trailing edges coinciding with said first and second pulses, means for comparing said square-wave signal with said third pulse to produce an output control signal when the square wave-signal overlaps said third pulse, and means for disabling said synchronous machine in response to said output control signal.

2. The system of claim 1 wherein the third pulse leads said first pulse and wherein the second pulse coincides with said square-wave signal to produce said output control signal to disable the synchronous machine when said rotor lags said alternating current power by a predetermined phase angle.

3. The system of claim 1 wherein the third pulse leads said first pulse and wherein the second pulse coincides with said square-wave signal to produce an output control signal to disable the synchronous machine when said rotor leads said alternating current power under regeneration conditions by a predetermined phase angle.

4. The system of claim 1 wherein said first and third pulses are dervied from said alternating current power and are in synchronism therewith.

5. The system of claim 1 wherein said second pulse is produced by a pulse source cooperative with said rotor.

6. The system of claim 5 wherein said pulse source is a magnetic pickup.

7. The system of claim 4 wherein said first pulse occurs at the peak of an alternating current power waveform applied to said synchronous machine.

8. The system of claim 1 wherein the synchronous machine is a three-phase machine having applied thereto three phases of alternating current power, and including means coupled to one of said phases for producing said first pulse at a zero crossing of said one phase, and means coupled to another of said phases for producing said third pulse at a zero crossing of said other phase.

9. The system of claim 8 wherein the means for producing said first and third pulses includes a Zener diode across which a phase of said three-phase power is applied, and a differentiator coupled to the output of said Zener diode.

10. The system of claim 8 wherein said one pulse is produced when its associated phase crosses the zero axis in the negative-going direction while said third pulse is produced when its associated phase crosses the zero axis in the positive-going direction, whereby said first and third pulses are separated by a 60° phase angle.

11. The system of claim 8 including means coupled to the remaining third phase of said three-phase power for producing a fourth pulse at the zero crossing of said third phase, means for comparing said square-wave signal with the fourth pulse to produce a second output control signal upon coincidence of the latter two, and means responsive to said second output control signal for disabling said synchronous machine.

12. The system of claim 11 wherein said square-wave signal will coincide with the third pulse under motoring conditions of the synchronous machine while the square-wave signal will coincide with the fourth pulse under regeneration conditions.

References Cited

UNITED STATES PATENTS 3,020,462  2/1962  MacGregor _____ 318—170
3,048,755  8/1962  Leonhard _____ 318—170

ORIS L. RADER, Primary Examiner

G. RUBINSON, Assistant Examiner

U.S. Cl. X.R.

318—175